(12) United States Patent
Bowden et al.

(10) Patent No.: US 12,410,749 B2
(45) Date of Patent: *Sep. 9, 2025

(54) ENGINE HAVING AN OPEN FAN WITH REDUCED BOUNDARY LAYER INDUCED DISTORTION

(71) Applicant: General Electric Company, Schenectady, NY (US)

(72) Inventors: William Joseph Bowden, Cleves, OH (US); Steven B. Morris, Mason, OH (US); Vicente Jerez Fidalgo, South Bend, IN (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,663

(22) Filed: Jul. 16, 2024

(65) Prior Publication Data

US 2024/0369016 A1    Nov. 7, 2024

Related U.S. Application Data

(62) Division of application No. 18/171,698, filed on Feb. 21, 2023, now Pat. No. 12,055,094.

(51) Int. Cl.
| | |
|---|---|
| *F02C 7/042* | (2006.01) |
| *F01D 25/02* | (2006.01) |
| *F01D 25/12* | (2006.01) |

(52) U.S. Cl.
CPC ............ *F02C 7/042* (2013.01); *F01D 25/02* (2013.01); *F01D 25/12* (2013.01)

(58) Field of Classification Search
CPC ...................................................... F01D 9/065
See application file for complete search history.

(56) References Cited

U.S. PATENT DOCUMENTS

| | | |
|---|---|---|
| 2,622,688 A | 12/1952 | Lee |
| 2,637,403 A | 5/1953 | Wallace |
| 3,382,670 A | 5/1968 | Venable |
| 4,928,480 A | 5/1990 | Oliver et al. |
| 4,998,995 A | 3/1991 | Blythe |
| 5,066,195 A | 11/1991 | Dobrzynski |
| 5,345,760 A | 9/1994 | Giffin, III |
| 10,399,664 B2 | 9/2019 | Bowden et al. |
| 2004/0179941 A1 | 9/2004 | Negulescu |
| 2018/0016989 A1 | 1/2018 | Abe et al. |
| 2021/0108572 A1 | 4/2021 | Khalid et al. |

*Primary Examiner* — Brian O Peters
(74) *Attorney, Agent, or Firm* — Dority & Manning, P.A.

(57) ABSTRACT

An engine includes a fan section having an open fan defining an axial centerline and a rotor. The rotor includes a plurality of fan blades mounted to a hub and being rotatable about the axial centerline. The engine also includes a turbomachine downstream of the fan section. The turbomachine includes a core cowl that defines an engine inlet and encloses turbomachinery. Further, the engine includes an airflow diverting assembly downstream of the fan section and upstream of the engine inlet. The airflow diverting assembly includes at least one fluid passageway formed into at least a portion of the hub for diverting at least a portion of a boundary layer on a surface of the hub away from the surface of the hub to reduce distortion caused by the boundary layer in the turbomachinery.

8 Claims, 7 Drawing Sheets

FIG. 9 ined Distortion", filed Feb. 21, 2023, the entire disclosure of which is hereby expressly incorporated by reference herein.

ENGINE HAVING AN OPEN FAN WITH REDUCED BOUNDARY LAYER INDUCED DISTORTION

CROSS-REFERENCE TO RELATED APPLICATION

The present application is a divisional of and claims priority to U.S. application Ser. No. 18/171,698 entitled "Engine Having an Open Fan with Reduced Boundary Layer Induced Distortion", filed Feb. 21, 2023, the entire disclosure of which is hereby expressly incorporated by reference herein.

FIELD

The present disclosure relates generally to turbofan engines and turboprop engines, or more particularly to an engine having an open or unducted fan with reduced boundary layer induced distortion.

BACKGROUND

A turbofan engine generally includes a turbomachine and a rotor assembly, or fan section, with a single stage of unducted rotor blades. Generally, the turbomachine includes, in serial flow order, a compressor section, a combustion section, a turbine section, and an exhaust section. The turbomachine also typically includes a core cowl that defines an annular core inlet. As such, the core cowl further encloses at least in part a low pressure system and a high pressure system. For example, in some instances, the core cowl encloses and supports at least in part a booster or low pressure ("LP") compressor for pressurizing air that enters the turbomachine through a core inlet. A high pressure ("HP"), multi-stage, axial-flow compressor receives pressurized air from the LP compressor and further increases the pressure of the air. The pressurized air stream flows downstream to a combustor of the combustion section where fuel is injected into the pressurized air stream and ignited to raise the temperature and energy level of the pressurized air.

High energy combustion products flow from the combustor downstream to an HP turbine. The HP turbine drives the HP compressor through an HP shaft. In this regard, the HP turbine is drivingly coupled with the HP compressor. The high energy combustion products then flow to an LP turbine. The LP turbine drives the LP compressor and components of the fan section through an LP shaft. As such, the fan is coupled with the LP shaft via a speed reduction gearbox, e.g., in an indirect-drive or geared-drive configuration. In this regard, the LP turbine is drivingly coupled with the LP compressor and components of the fan section. After driving each of the LP and HP turbines, the combustion products exit the turbomachine through a turbomachine exhaust nozzle. Accordingly, the turbomachine defines a working gas flowpath or core duct that extends between the core inlet and the turbomachine exhaust nozzle.

The fan section generally includes a fan having an open rotor or un-ducted fan. Further, the fan typically includes an array of fan blades secured to a hub and rotatable about a longitudinal axis. However, such fans or similar compression turbomachinery is often challenged to achieve efficiency requirements across wider ranges of operation, while maintaining acceptable stall margin.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes (IGVs), valves, variable exhaust geometry, or fluidic features) to adjust or optimize overall system performance across a broad range of potential operating conditions.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally directed to a turbofan engine having a turbomachine and a rotor assembly, or fan section, with a single stage of unducted rotor blades mounted to a hub or spinner. Further, the turbomachine generally includes, in serial flow order, a compressor section, a combustion section, a turbine section, and an exhaust section. The fan section generally includes a fan having an open rotor or un-ducted fan. Further, the fan typically includes an array of fan blades secured to the hub and rotatable about a longitudinal axis. As such, for un-ducted fans to operate efficiently at desirable flight speeds, a large hub or spinner is required, which is unique versus ducted fans having inlets that reduce the flow velocity into the fan versus flight speed. In contrast, un-ducted fans do not have the ability to reduce the flow velocity in this matter, so un-ducted fans must resolve incoming flow at higher speeds via a larger rotor. However, the increased size of the hub causes a viscous boundary layer of weak flow to develop along the hub prior to entering an engine inlet of the ducted turbomachine. This hub flow path boundary layer is a distortion that needs to be minimized to improve efficiency and stall margin of the turbofan engine. As used herein, "distortion" is generally defined as a variation in the radial velocity profile of flow entering the inlet. A corresponding definition is the variation in the radial total pressure profile. Circumferential distortion can also exist when the engine is at non-zero angle of attack to flight path. As weak flow is removed from the hub, the remaining inlet flow profile becomes more uniform.

Accordingly, the present disclosure is directed to an engine and methods for reducing boundary layer induced distortion, the engine having an airflow diverting assembly downstream of the fan section and upstream of the engine inlet that removes this boundary layer in part or in total, by means of active or passive flow suction, to reduce the distortion to be resolved by the downstream turbomachine. In an embodiment, for example, the airflow diverting assembly includes at least one fluid passageway formed into at least a portion of the hub for diverting at least a portion of the boundary layer on a surface of the hub away from the surface of the hub to reduce distortion caused by the boundary layer in the engine. Thus, in an embodiment, the bled or suctioned air from the boundary layer can be used for internal component cooling (e.g., electronics, gearbox, downstream full authority digital engine control (FADEC), and/or other systems, etc.), if desired, before joining other existing ventilation flows. As such, reducing this boundary layer makes the radial aerodynamic profile entering the turbomachine more uniform. The more uniform the flow, the less constrained the immediately downstream stator vanes and rotor blades become. Lower acoustic source opportunities via either achieving same core/mid-fan flows at lower rotation speeds translates to less losses, lower fan speeds, and reduced self and interaction fan noise sources. Moreover, by removing at least some of the hub boundary layer, unsteadiness from the boundary layer into the mid-fan stream can also be reduced. Turbulence intensity informs source radiation strength both on mid-fan inlet guide vanes as well as core stream inlet noise sources.

Accordingly, the present disclosure provides many advantages over the prior art. In particular, in certain embodiments, the airflow diverting assembly of the present disclosure takes advantage of an existing gap between the rotatable hub and an engine inlet and has minimal impact to existing flow path without suction. Moreover, in an embodiment, the airflow diverting assembly of the present disclosure is configured to reduce or eliminate thick boundary layer formation along the larger hub in an un-ducted fan. Accordingly, IGV, mid-fan rotor and variable IGV design constraints (specifically for the mid-fan's IGVs upstream of the mid-fan rotor) for distortion and stall margin can be eased, thereby improving design flexibility of the engine. In other embodiments, the airflow diverting assembly of the present disclosure can also be implemented with engines without a mid-fan, such as a turboprop engine. In certain embodiments, the airflow diverting assembly of the present disclosure provides an opportunity for performance improvement or envelope expansion. Moreover, the airflow diverting assembly of the present disclosure is configured to improve operation of the engine for high angle of attack (AoA).

Figure 1:
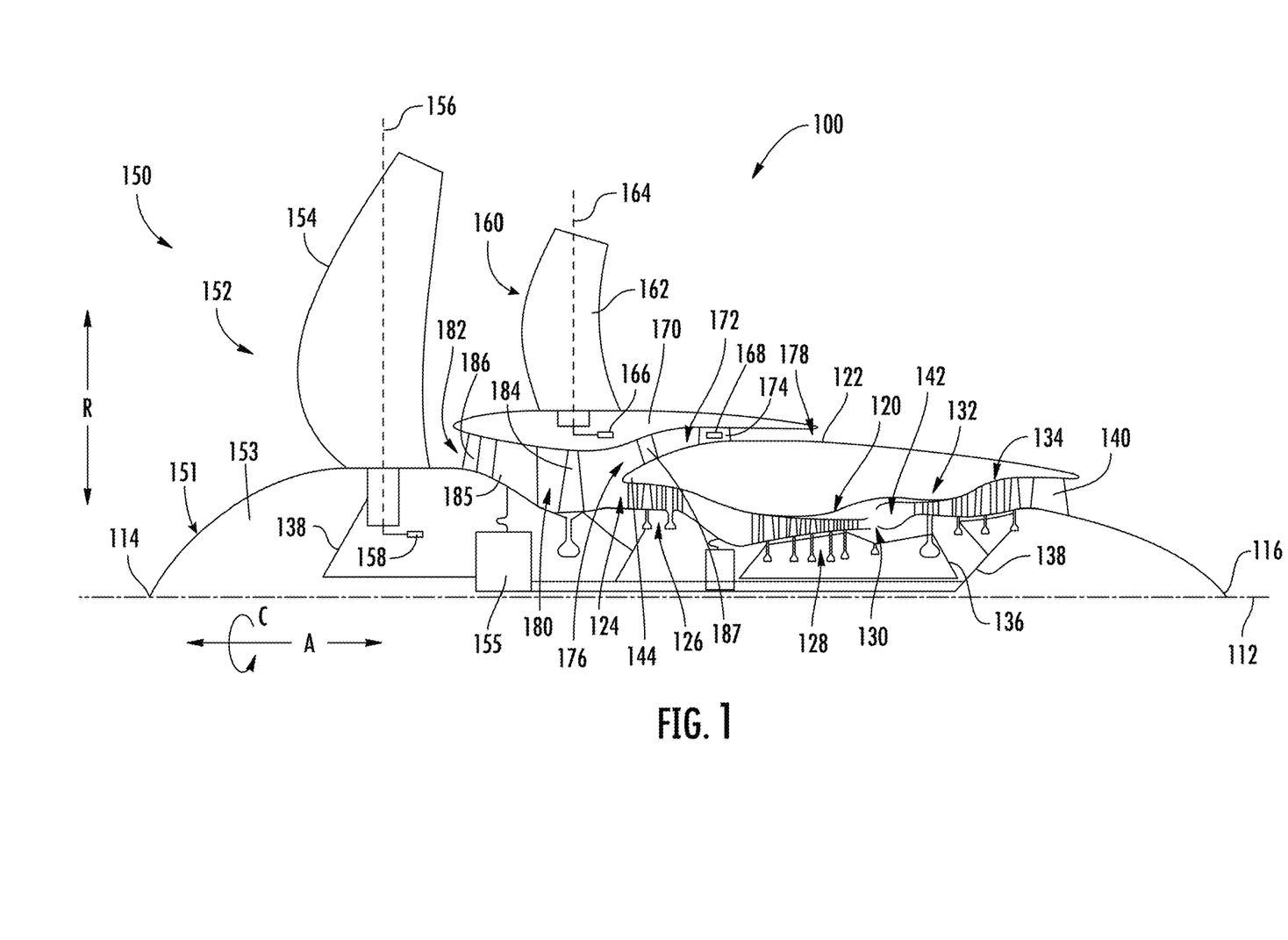
FIG. 1 is a schematic, cross-sectional view of a portion of a gas turbine engine in accordance with an exemplary embodiment of the present disclosure.

Referring now to FIG. 1, a schematic cross-sectional view of a gas turbine engine 100 ("engine 100") is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below. In further embodiments, the engine 100 may be a turboprop engine.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction C extends three hundred sixty degrees (360°) around the longitudinal axis 112. The engine 100 extends between a forward end 114 and an aft end 116, e.g., along the axial direction A.

The engine 100 includes a turbomachine 120 and the rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to an HP turbine 132. The HP turbine 132 drives the HP compressor 128 through an HP shaft 136. In this regard, the HP turbine 132 is drivingly coupled with the HP compressor 128. The high energy combustion products then flow to an LP turbine 134. The LP turbine 134 drives the LP compressor 126 and components of the fan section 150 through an LP shaft 138. In this regard, the LP turbine 134 is drivingly coupled with the LP compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes an open fan 152, which is the primary fan in this example embodiment. For the depicted embodiment of FIG. 1, the open fan 152 ("fan 152") is an open rotor or unducted fan 152. In such a manner, the engine 100 may be referred to as an open rotor engine.

As depicted, the fan 152 includes a rotor 151 having a plurality of fan blades 154 (only one shown in FIG. 1) mounted to a hub 153 or spinner that is rotatable about the longitudinal axis 112/centerline. The fan blades 154 are rotatable, e.g., about the longitudinal axis 112. As noted above, the fan 152 is drivingly coupled with the LP turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the plurality of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 (also referred to herein as a mid-fan) is included aft of the fan 152, such that the engine 100 includes both a ducted and an unducted fan which both serve to generate thrust through the movement of air without passage through at least a portion of the turbomachine 120 (e.g., without passage through the HP compressor 128 and the combustion section for the embodiment depicted). The ducted fan 184 is rotatable about the same axis (e.g., the longitudinal axis 112) as the fan blade 154. The ducted fan 184 is, for the embodiment depicted, driven by the LP turbine 134 (e.g., coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. Moreover, as shown, the fan duct 172 may include an array of mid-fan outlet guide vanes 187.

The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 and a strut 185 downstream of the inlet guide vanes 186. Further, as shown, the inlet guide vanes 186 are positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. In an embodiment, one or more actuators may be provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, it will be appreciated that for the embodiment depicted, the fan exhaust nozzle 178 of the fan duct 172 is further configured as a variable geometry exhaust nozzle. In such a manner, the engine 100 may include one or more actuators (not shown) for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the mid-fan outlet guide vanes 187 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 168 may be positioned in thermal communication with the fan duct 172. For example, one or more heat exchangers 168 may be disposed within the fan duct 172 on one or more of the struts 174 and utilized to cool one or more fluids from the core engine with the air passing through the fan duct 172, as a resource for removing heat from a fluid, e.g., compressor bleed air, oil or fuel.

Although not depicted, the heat exchanger 168 may be an annular heat exchanger extending substantially 360 degrees in the fan duct 172 (e.g., at least 300 degrees, such as at least 330 degrees). In such a manner, the heat exchanger 168 may effectively utilize the air passing through the fan duct 172 to cool one or more systems of the engine 100 (e.g., lubrication oil systems, compressor bleed air, electrical components, etc.). The heat exchanger 168 uses the air passing through duct 172 as a heat sink and correspondingly increases the temperature of the air downstream of the heat exchanger 168 and exiting the fan exhaust nozzle 178.

Figure 2:
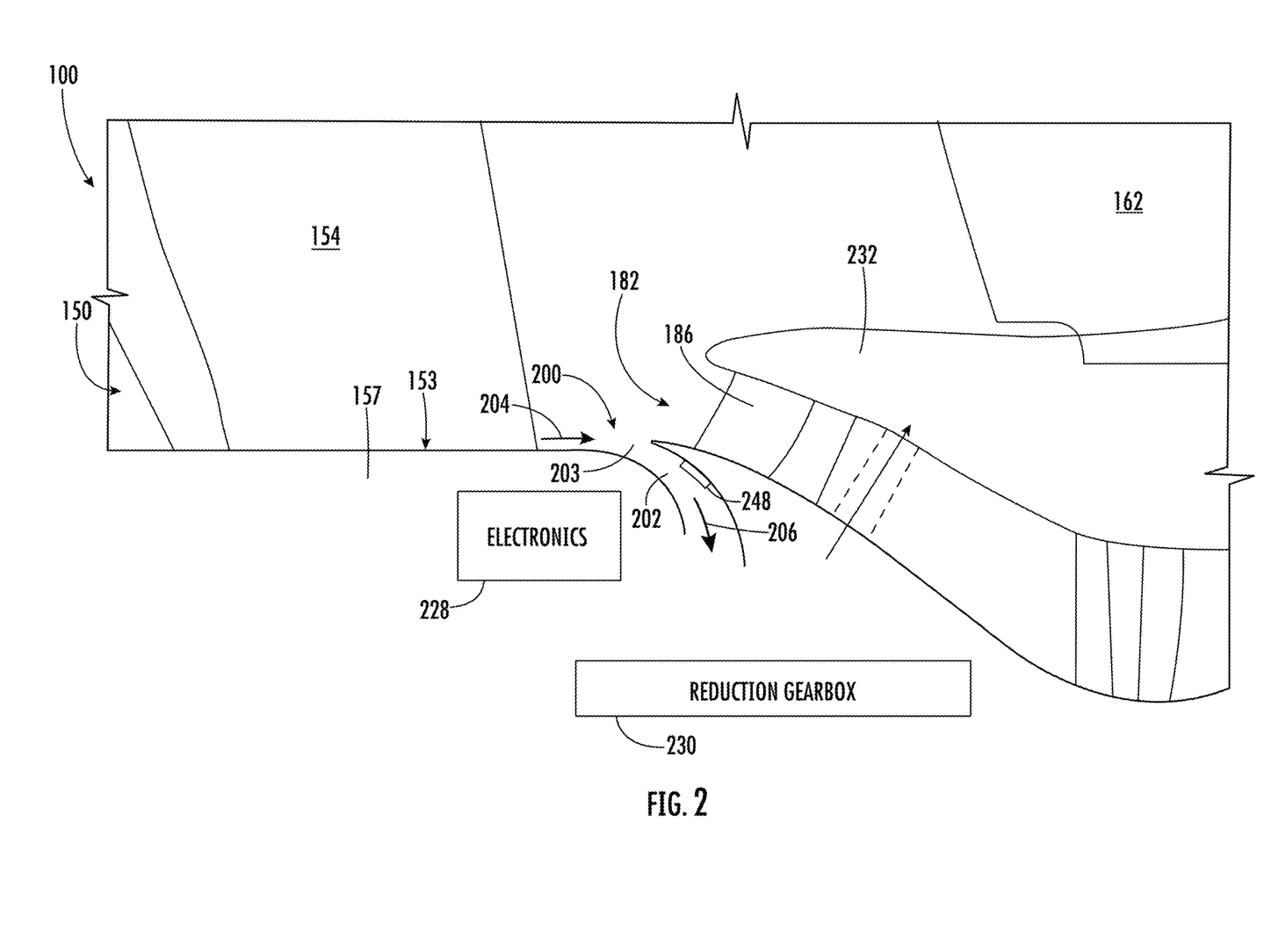
FIG. 2 is a detailed, schematic view of a portion of a gas turbine engine in accordance with an exemplary embodiment of the present disclosure, particularly illustrating an airflow diverting assembly downstream of a fan section of the gas turbine engine.

Referring now to FIG. 2, a close-up, schematic view of a portion of the fan section 150 of FIG. 1 is provided. Additionally, for the embodiment depicted, the engine 100 includes an airflow diverting assembly 200 downstream of the fan section 150 and upstream of the engine inlet 182. Furthermore, in an embodiment, as shown, the airflow diverting assembly 200 generally includes at least one fluid passageway 202 formed into at least a portion of the hub 153 for diverting at least a portion 206 ("airflow 206") of a boundary layer (as represented by arrow 204) on a surface 157 of the hub 153 away from the surface 157 of the hub 153 to reduce distortion caused by the boundary layer 204 in the turbomachine 120 (FIG. 1). More specifically, according to the illustrated embodiment, an inlet 203 of the fluid passageway 202 may be positioned on a top side of the hub 153 at a location upstream of the engine inlet 182. Further, as shown, the inlet 203 is fluidly coupled with the fluid passageway 202 that extends through the hub 153. In this manner, the fluid passageway 202 receives airflow (indicated by arrows 204) via the inlet 203 and diverts the airflow away from the surface 157 of the hub 153.

In an embodiment, as shown, the airflow diverting assembly 200 may be a passive system that is passively controlled. As used herein, a passive system generally refers to a system that does not have variable geometry requiring valves or actuators, or electronics control loop/logic. An exemplary passive system is a series of ducts that enable the bled boundary layer (portion 206 of the boundary layer 204) to be fed into a downstream flow stream that is of lower static pressure than the bled flow. This system has a positive pressure gradient in that the downstream flow suctions the bled flow by means of eductor/ejector physics. In such embodiments, the momentum of the bled flow alone may not be enough to travel to an exhaust. As such, the third stream duct or core compartment are two "sink" locations that could educt this bled boundary layer flow. A passive control device could be a spring-loaded door—air pressure on the door causes the spring to react and the door to open or close.

In alternative embodiments, the airflow diverting assembly 200 may be an active system having various features for actively controlling the airflow 206 such as e.g., via a controller 300 (FIG. 8) that controls one or more electronics 228 described herein (FIG. 2), which may include, for example, at least one of one or more fans 213 (FIG. 4), one or more actuators 214 (FIG. 4), one or more valves 216 (FIG. 4), or similar to divert at least a portion 206 of the boundary layer flow 204 as desired. For example, in an embodiment, the airflow diverting assembly 200 may include one or more fans 213 in fluid communication with the fluid passageway 202 for increasing a pressure or velocity of the airflow 206. In addition, the inlet 203 may include a valve for controlling the airflow 206 through the fluid passageway 202. In particular embodiments, as an example, the fan(s) 213 may be an electric fan positioned within the fluid passageway 202 and the valve(s) described herein may be a variable throughput valve configured for controlling the flow rate of the airflow 206.

Additionally, the airflow diverting assembly 200 may include one or more sensors 248 positioned in or adjacent to the fluid passageway 202 for determining one or more of a pressure or velocity of the airflow 206 through the fluid passageway 202. Notably, the engine 100 may further include additional sensors for measuring parameters of the engine 100, which may also be used to control the airflow diverting assembly 200. Further, for the embodiment depicted, the airflow diverting assembly 200 additionally includes the controller 300, which may in certain exemplary embodiments be configured as part of a main aircraft controller or the engine 100, operably connected to the fan(s) 213, the actuator(s) 214, the valve(s) 216, and the sensors 248 through one or more wired or wireless communication buses. Accordingly, in certain embodiments, the controller 300 may be configured to operate the fan(s) 213, the actuator(s) 214, and/or the valve(s) 216 at least in part in response to the pressures and/or velocities measured by the sensors 248.

Figure 3:
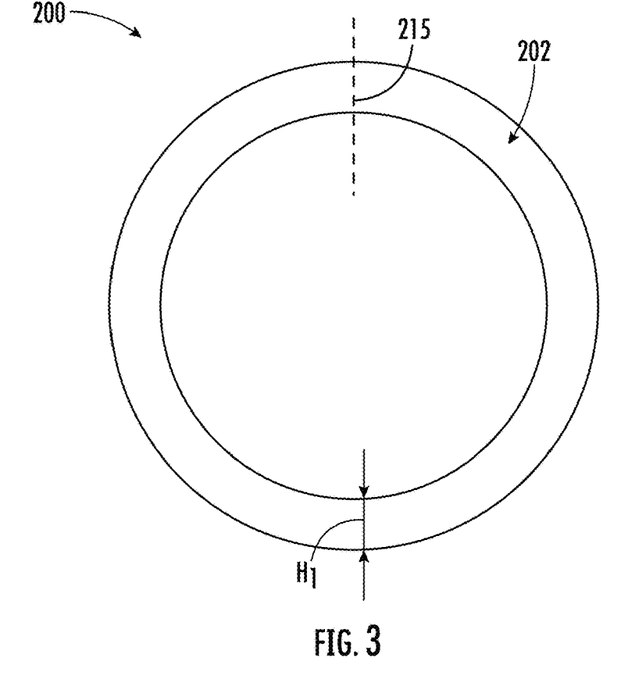
FIG. 3 is a front view of a portion of a fluid passageway of an airflow diverting assembly of a gas turbine engine in accordance with an exemplary embodiment of the present disclosure, particularly illustrating the fluid passageway having a constant height around a circumference thereof.

Referring now to FIGS. 3-7, different embodiments of the fluid passageway 202 according to the present disclosure are provided. In particular, FIG. 3 illustrates a front view of an embodiment of the fluid passageway 202 according to the present disclosure. Thus, as shown in the illustrated embodiment, an inlet height $H_1$ of the fluid passageway 202 is constant around a circumference C of the fluid passageway 202. In another embodiment, the inlet height $H_1$ of the fluid passageway 202 may vary around the circumference C of the fluid passageway 202, e.g., so as to change a flow rate at various clockwise positions. Moreover, as shown, the fluid passageway extends continuously in a circumferential direction from 0° to 360°. As used herein, extending "continuously" in the circumferential direction from 0° to 360° means that the fluid passageway 202 is unobstructed or uninterrupted from 0° to 360°.

Accordingly, in certain embodiments, the fluid passageway 202 may extend circumferentially along any suitable angle, such as circumferentially from or between 0° and 360° starting at any clockwise location from top-dead-center of the engine 100. For example, as shown in FIG. 3, the fluid passageway 202 extends continuously circumferentially from 0° to 360° starting at any clockwise location from top-dead-center 215 of the engine 100 around the entirety of the circumference C.

Figure 4:
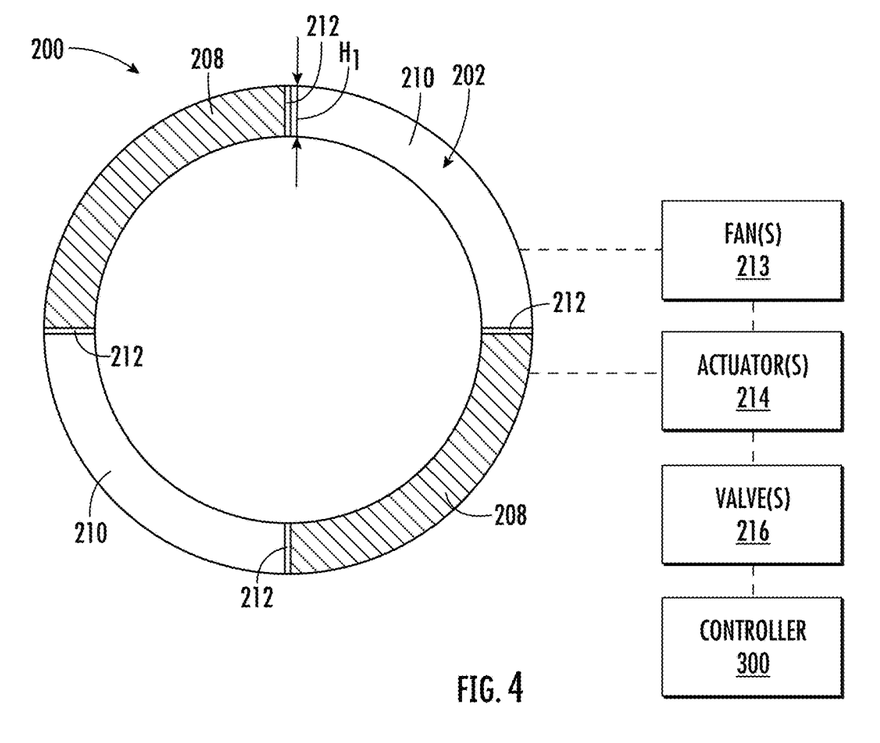
FIG. 4 is a front view of a portion of a fluid passageway of an airflow diverting assembly of a gas turbine engine in accordance with an exemplary embodiment of the present disclosure, particularly illustrating the fluid passageway having a variable geometry around a circumference thereof.

In alternative embodiments, as shown in FIG. 4, the fluid passageway 202 may extend less than the full 360° circumference and/or may have a variable geometry around the circumference C. For example, as shown, the fluid passageway 202 may be interrupted or divided into a plurality of regions 208, 210 via at least one split member 212. In particular, as shown, the fluid passageway 202 includes four split members 212 dividing the fluid passageway 202 into four quadrants. In other embodiments, the fluid passageway 202 may include any number of split members 212 including more than four or less than four split members to divide the fluid passageway 202 into any suitable number of regions. Additionally, the split members 212 may be substantially evenly spaced to divide the fluid passageway 202 into regions of substantially the same size, or alternatively, may vary in spacing in order to control the airflow 206 as desired.

Accordingly, as shown, one or more of the regions of the circumference C of the fluid passageway 202 may be closed (as indicated by regions 208), whereas one or more other regions of the circumference C may be opened (as indicated by regions 210). In such embodiments, the variable geometry of the fluid passageway 202 may be actively controlled based on a desired flow rate at different circumferential locations of the fluid passageway 202. In other words, the different regions 208, 210 of the circumference C of the fluid passageway 202 may be actively controlled such that the regions 208, 210 are opened and/or closed to achieve a desired flow rate through the fluid passageway 202. For example, in an embodiment, one or more of the plurality of regions 208, 210 may be actively opened or closed via one of the one or more actuators 214 and/or the one or more valves 216.

Figure 5:
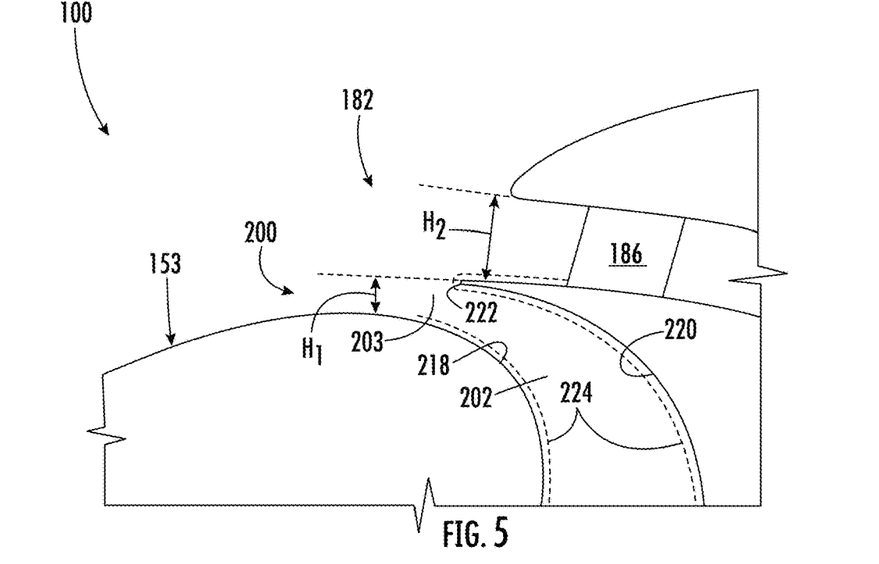
FIG. 5 is another detailed, schematic view of a portion of a gas turbine engine in accordance with an exemplary embodiment of the present disclosure, particularly illustrating an airflow diverting assembly downstream of a fan section of the gas turbine engine.
Figure 6:
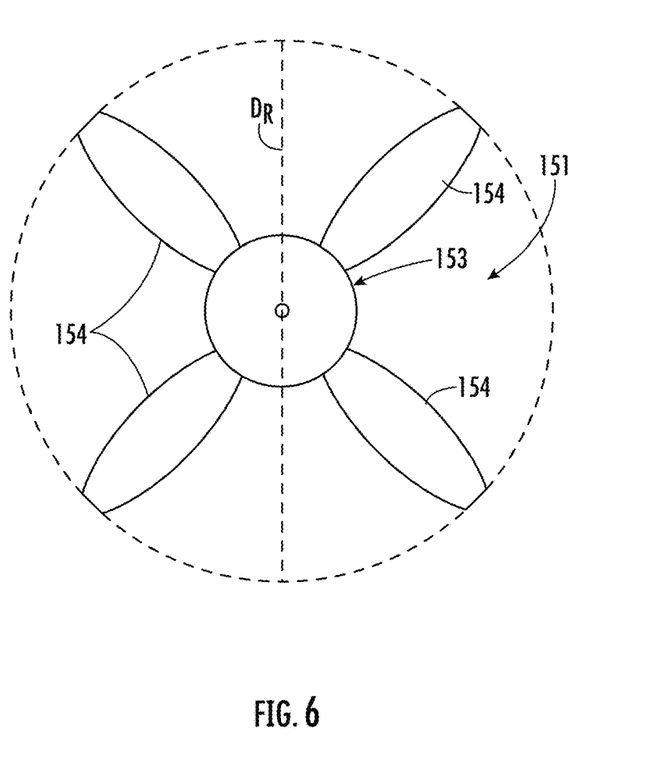
FIG. 6 is a front view of a portion of a rotor of a gas turbine engine in accordance with an exemplary embodiment of the present disclosure, particularly illustrating a rotor diameter of the rotor.

Referring particularly to FIGS. 5 and 6, the inlet height $H_1$ (FIG. 5) of the fluid passageway 202 may range from about 0.1% to about 5% of a rotor diameter DR of the rotor 151 (FIG. 6). In another embodiment, as shown in FIG. 5, the inlet height $H_1$ of the fluid passageway 202 may range from about 1% to about 150% of a height $H_2$ of the engine inlet 182. In still another embodiment, the fluid passageway 202 is configured to provide a design flow rate of about 0.1% to about 10% of a non-suction inlet flow rate into the engine inlet 182. In further embodiments, the fluid passageway 202 is configured to provide a design flow rate of about 0.1% to about 50% of an engine core flow rate.

In additional embodiments, as shown in FIG. 5, an inner diameter wall 218 of the fluid passageway 202 may be secured to the hub 153 and is thus rotatable, whereas an outer diameter wall 220 of the fluid passageway 202 may be secured to the engine inlet 182 and is thus non-rotatable. In alternative embodiments, the inner diameter wall 218 of the fluid passageway 202 may be non-rotatable, whereas the outer diameter wall 220 of the fluid passageway 202 may be secured to the engine inlet 182 and is also non-rotatable.

In yet another embodiment, a lip 222 of the fluid passageway 202 is at least partially hidden by the hub 153 as viewed from a forward aft view of the hub 153. In further embodiments, the lip 222 of the fluid passageway 202 may be completely hidden by the hub 153 as viewed from the forward aft view of the hub 153. In still another embodiment, the lip 222 of the fluid passageway 202 may not be hidden by the hub 153 as viewed from the forward aft view of the hub 153. For example, as shown in FIG. 6 the inlet height $H_1$ (FIG. 5) of the lip 222 may be designed such that an outer radius defined by the lip 222 is less than a maximum radius of the hub 153 upstream of the fan blades 154. In other words, the lip 222 is radially inward of the maximum radius of the hub 153 upstream of the fan blades 154 so as to "hide" the lip 222. Thus, by hiding the lip 222 in this manner, the inlet 203 of the fluid passageway 202 is protected from ingestion of foreign objects or debris.

In additional embodiments, as shown in in FIG. 5, the fluid passageway 202 comprises one or more de-icing devices 224. In particular, as shown, the de-icing devices 224 may include one or more de-icing blankets 224. In such embodiments, the de-icing blankets 224 may also be used for de-icing other components of the engine 100, such as e.g., the inlet guide vanes 186.

Figure 7:
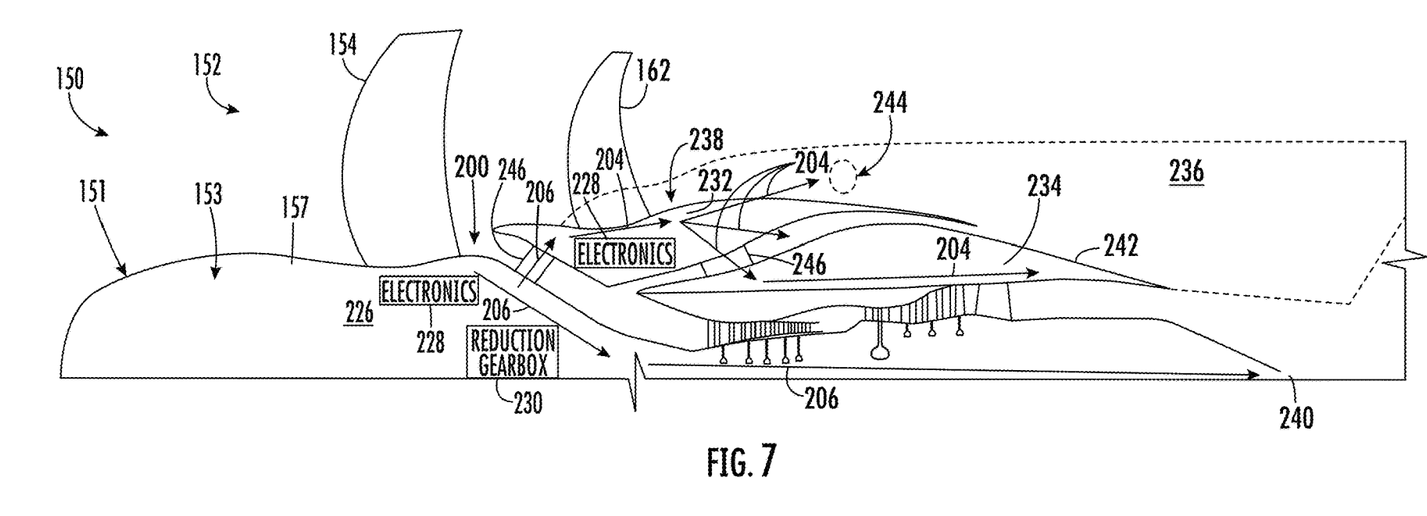
FIG. 7 is a schematic view of a portion of a gas turbine engine in accordance with an exemplary embodiment of the present disclosure, particularly illustrating an airflow path of an airflow diverting assembly.

Referring particularly now to FIG. 7, the portion 206 of the boundary layer 204 diverted away from the surface 157 of the hub 153 may be diverted to certain locations to cool one or more electronic or mechanical components of the engine 100 (e.g., such as electronics 228 and/or a reduction gearbox 230 of the engine 100). In such embodiments, the electronics 228 may be cooled directly by air flowing over the components thereof. Further, in an embodiment, the reduction gearbox 230 may be cooled by air directly flowing over the reduction gearbox 230. In further embodiments, the reduction gearbox 230 or other system oil may be cooled by means of a heat exchanger (not shown). Moreover, as shown, the portion 206 of the boundary layer 204 diverted away from the surface 157 of the hub 153 may be recirculated within at least a portion of a hub compartment 226, a mid-fan compartment 232, a core compartment 234, or a pylon compartment 236 before being exhausted via one or more ventilation paths 238, 240, 242, 244 that act as flow sinks, thereby enabling a passive system. In such embodiments, the engine 100 may further include one or more flow guides 246 arranged with the hub compartment 226, the mid-fan compartment 232, the core compartment 234, and/or the pylon compartment 236 to direct flow to or away from the one or more electronic or mechanical components of the engine 100 as desired. In such embodiments, the flow guide(s) 246 are configured to direct flow to and/or away from specific systems in the engine 100 for thermal control benefits and to maximize aerothermal efficiency; i.e., maximum thrust recovery of the bled air to minimize overall engine specific fuel consumption (SFC).

Figure 8:
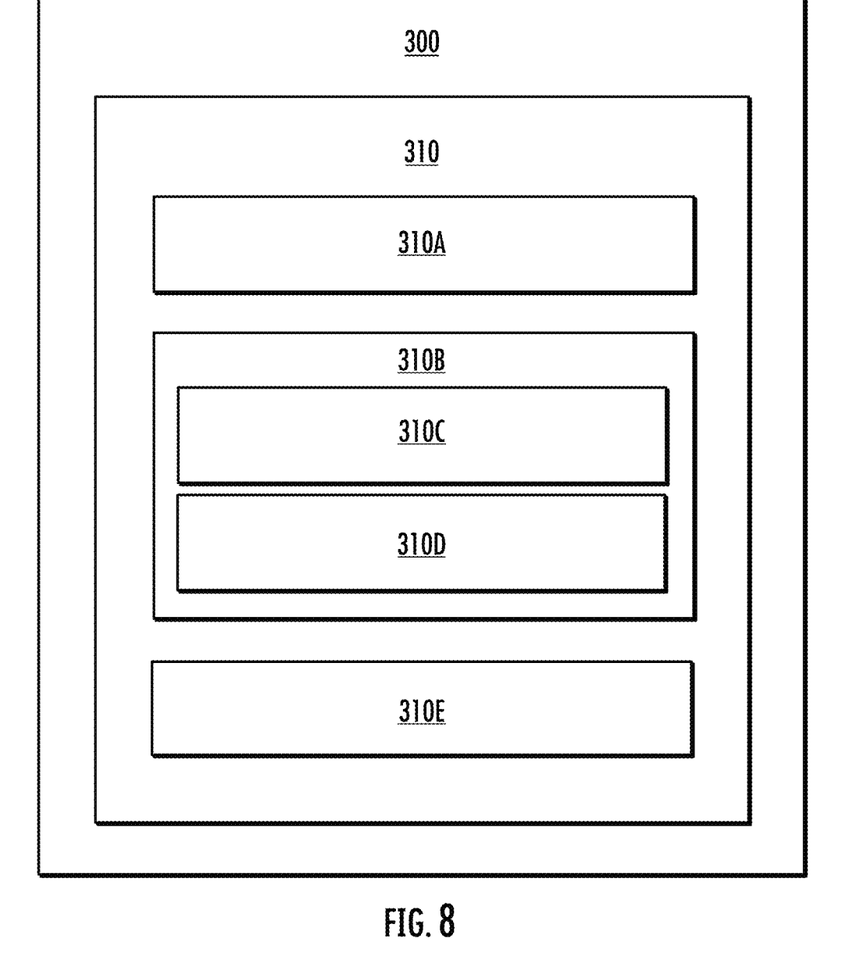
FIG. 8 illustrates a block diagram of a controller in accordance with an exemplary embodiment of the present disclosure.

Referring now to FIG. 8, it should be understood that the controller 300 may be any suitable controller. For example, in one or more exemplary embodiments, the controller 300 may be a stand-alone controller, or alternatively, may be integrated into one or more of a controller for the engine 100 (FIG. 1) or a controller for an aircraft including the engine 100.

Referring particularly to the operation of the controller 300, in at least certain embodiments, the controller 300 can include one or more computing device(s) 310. The computing device(s) 310 can include one or more processor(s) 310A and one or more memory device(s) 310B. The one or more processor(s) 310A can include any suitable processing device, such as a microprocessor, microcontroller, integrated circuit, logic device, and/or other suitable processing device. The one or more memory device(s) 310B can include one or more computer-readable media, including, but not limited to, non-transitory computer-readable media, RAM, ROM, hard drives, flash drives, and/or other memory devices.

The one or more memory device(s) 310B can store information accessible by the one or more processor(s) 310A, including computer-readable instructions 310C that can be executed by the one or more processor(s) 310A. The instructions 310C can be any set of instructions that when executed by the one or more processor(s) 310A, cause the one or more processor(s) 310A to perform operations. In some embodiments, the instructions 310C can be executed by the one or more processor(s) 310A to cause the one or more processor(s) 310A to perform operations, such as any of the operations and functions for which the controller 300 and/or the computing device(s) 310 are configured, the operations for operating the engine 100, as described herein, and/or any other operations or functions of the one or more computing device(s) 310. The instructions 310C can be software written in any suitable programming language or can be implemented in hardware. Additionally, and/or alternatively, the instructions 310C can be executed in logically and/or virtually separate threads on the one or more processor(s) 310A. The one or more memory device(s) 310B can further store data 310D that can be accessed by the one or more processor(s) 310A. For example, the data 310D can include data indicative of power flows, data indicative of engine/aircraft operating conditions, and/or any other data and/or information described herein.

The computing device(s) 310 can also include a network interface 310E used to communicate, for example, with the other components of the engine 100 (e.g., via a communication network). The network interface 310E can include any suitable components for interfacing with one or more network(s), including for example, transmitters, receivers, ports, controllers, antennas, and/or other suitable components. One or more devices can be configured to receive one or more commands from the computing device(s) 310 or provide one or more commands to the computing device(s) 310.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 9:
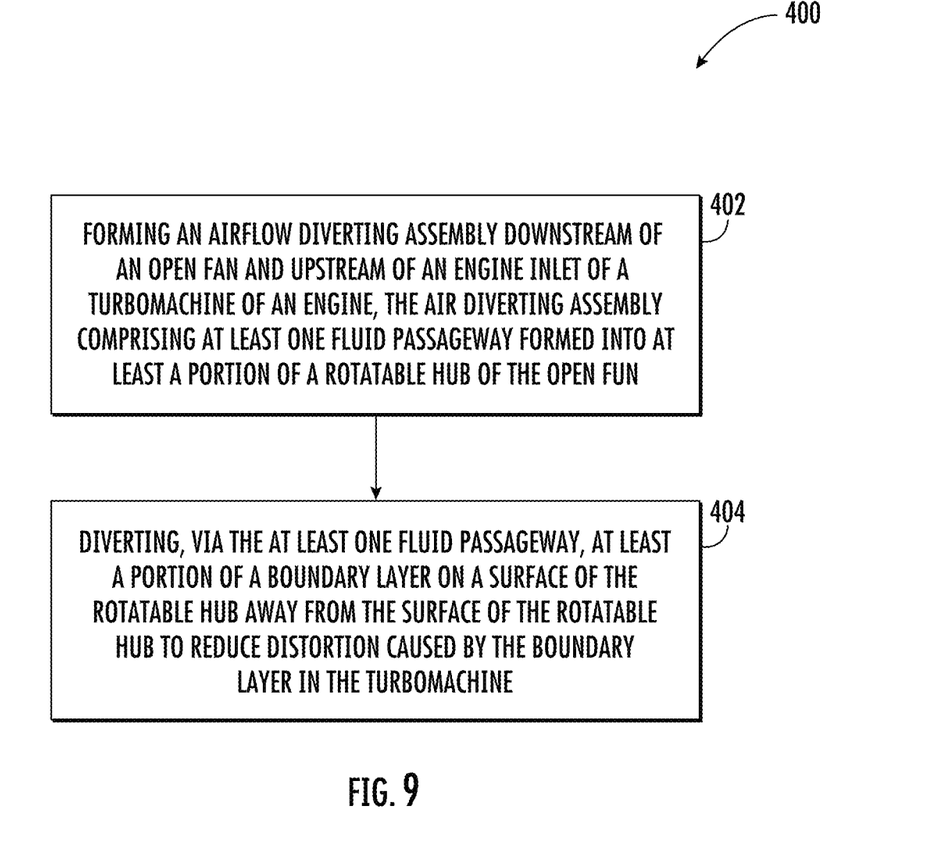
FIG. 9 illustrates a flow diagram of a method for reducing a boundary layer of an open fan of a fan section of an engine in accordance with an exemplary embodiment of the present disclosure.

Referring now to FIG. 9, a flow diagram of an embodiment of a method 400 for reducing a boundary layer of an open fan of a fan section of an engine is illustrated. In general, the method 400 is described herein as relating to the engine 100 (FIG. 1) and airflow diverting assembly 200 (FIG. 2). However, it should be appreciated that the disclosed method 400 may be implemented using any other suitable engine and airflow diverting assembly now known or later developed in the art. In addition, although FIG. 9 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (402), the method 400 includes forming an airflow diverting assembly downstream of an open fan and upstream of an engine inlet of a turbomachine of an engine, the airflow diverting assembly comprising at least one fluid passageway formed into at least a portion of a hub of the open fan. As shown at (404), the method 400 includes diverting, via the at least one fluid passageway, at least a portion of a boundary layer on a surface of the hub away from the surface of the hub to reduce distortion caused by the boundary layer in the turbomachine.

As will be appreciated from the description herein, various embodiments of a gas turbine engine are provided. Certain of these embodiments may be an unducted, single rotor gas turbine engine. Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least about 300 degrees, such as at least about 330 degrees).

In one or more of these embodiments, a threshold power or disk loading for a fan (e.g., an unducted single rotor or primary forward fan) may range from 25 horsepower per square foot (hp/ft2) or greater at cruise altitude during a cruise operating mode. In particular embodiments of the engine, structures and methods provided herein generate power loading between 80 hp/ft2 and 160 hp/ft2 or higher at cruise altitude during a cruise operating mode.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least about 25,000 pounds and less than about 80,000 of thrust during operation at a rated speed, such as between about 25,000 and 50,000 pounds of thrust during operation at a rated speed, such as between about 25,000 and 40,000 pounds of thrust during operation at a rated speed.

In various exemplary embodiments, the fan may include twelve (12) fan blades. From a loading standpoint, such a blade count may allow a span of each blade to be reduced such that the overall diameter of the primary fan may also be reduced (e.g., to about twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between about 1 and 10, or 2 and 7, or at least about 3.3, at least about 3.5, at least about 4 and less than or equal to about 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 rpm at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage LP compressor, an 11 stage HP compressor, a two stage HP turbine, and 4 stages, or between 4 and 7 stages for the LPT. As another example, an engine can include a three stage LP compressor, a 10 stage HP compressor, a two stage HP turbine, and a 7 stage LP turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures at the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

Further aspects are provided by the subject matter of the following clauses:

An engine, comprising: a fan section comprising an open fan defining an axial centerline and a rotor, the rotor comprising a plurality of fan blades mounted to a hub and being rotatable about the axial centerline; a turbomachine downstream of the fan section, the turbomachine comprising a core cowl that defines an engine inlet and encloses turbomachinery; and an airflow diverting assembly downstream of the fan section and upstream of the engine inlet, the airflow diverting assembly comprising at least one fluid passageway formed into at least a portion of the hub for diverting at least a portion of a boundary layer on a surface of the hub away from the surface of the hub to reduce distortion caused by the boundary layer in the turbomachinery.

The engine of any preceding clause, wherein the airflow diverting assembly is a passive system that is passively controlled.

The engine of any preceding clause, wherein a height of the at least one fluid passageway is constant around a circumference of the at least one fluid passageway.

The engine of any preceding clause, wherein the at least one fluid passageway extends circumferentially between 0° and 360° starting at any clockwise location from top-dead-center of the engine.

The engine of any preceding clause, wherein the at least one fluid passageway extends continuously in a circumferential direction from 0° to 360°.

The engine of any preceding clause, wherein the airflow diverting assembly is an active system that is actively controlled.

The engine of any preceding clause, wherein the airflow diverting assembly is actively controlled via a controller.

The engine of any preceding clause, wherein the at least one fluid passageway comprises a variable geometry.

The engine of any preceding clause, wherein the variable geometry of the at least one fluid passageway is actively controlled based on a desired flow rate at different circumferential locations of the at least one fluid passageway.

The engine of any preceding clause, wherein the airflow diverting assembly further comprises at least one of one or more fans, one or more actuators, or one or more valves.

The engine of any preceding clause, wherein the at least one fluid passageway is divided into a plurality of regions via at least one split member.

The engine of any preceding clause, wherein one or more of the plurality of regions are actively opened or closed via one of the one or more actuators or the one or more valves.

The engine of any preceding clause, wherein the at least one fluid passageway defines an inlet height ranging between about 0.1% and about 5% of a rotor diameter of the rotor.

The engine of any preceding clause, wherein the at least one fluid passageway defines an inlet height ranging between about 1% and about 150% of a height of the engine inlet.

The engine of any preceding clause, wherein the at least one fluid passageway defines an inlet height ranging from about 0.1% to about 5% of a rotor diameter of the rotor.

The engine of any preceding clause, wherein the at least one fluid passageway defines an inlet height ranging from about 1% to about 150% of a height of the engine inlet.

The engine of any preceding clause, wherein an inner diameter wall of the at least one fluid passageway is secured to the hub and is thus rotatable and an outer diameter wall of the at least one fluid passageway is secured to the engine inlet and is thus non-rotatable.

The engine of any preceding clause, wherein an inner diameter wall of the at least one fluid passageway is non-rotatable and an outer diameter wall of the at least one fluid passageway is secured to the engine inlet and is thus non-rotatable.

The engine of any preceding clause, wherein a lip of the at least one fluid passageway is at least partially hidden by the hub as viewed from a forward aft view of the hub.

The engine of any preceding clause, wherein the at least one fluid passageway comprises one or more de-icing devices.

The engine of any preceding clause, wherein the portion of the boundary layer diverted away from the surface of the hub is diverted to cool one or more electronic or mechanical components of the engine.

The engine of any preceding clause, wherein the portion of the boundary layer diverted away from the surface of the hub to cool the one or more electronic or mechanical components of the engine is recirculated within at least a portion of a hub compartment, a mid-fan compartment, a core compartment, or a pylon compartment before being exhausted via one or more ventilation paths that act as flow sinks enabling a passive system.

The engine of any preceding clause, further comprising one or more flow guides arranged with at least one of the hub compartment, the mid-fan compartment, the core compartment, or the pylon compartment to direct flow to or away from the one or more electronic or mechanical components of the engine.

The engine of any preceding clause, wherein the engine is one of a turbofan engine or a turboprop engine.

A method for reducing a boundary layer of an open fan of a fan section of an engine, the method comprising: forming an airflow diverting assembly downstream of the open fan and upstream of an engine inlet of a turbomachine of the engine, the airflow diverting assembly comprising at least one fluid passageway formed into at least a portion of a hub of the open fan; and diverting, via the at least one fluid passageway, at least a portion of a boundary layer on a surface of the hub away from the surface of the hub to reduce distortion caused by the boundary layer in the turbomachine.

The method of any preceding clause, wherein diverting, via the at least one fluid passageway, at least the portion of the boundary layer on the surface of the hub away from the surface of the hub further comprises: passively controlling the airflow diverting assembly to divert at least the portion of the boundary layer on the surface of the hub away from the surface of the hub.

The method of any preceding clause, wherein diverting, via the at least one fluid passageway, at least the portion of the boundary layer on the surface of the hub away from the surface of the hub further comprises: actively controlling the airflow diverting assembly to divert at least the portion of the boundary layer on the surface of the hub away from the surface of the hub.

The method of any preceding clause, wherein the at least one fluid passageway comprises a variable geometry, wherein actively controlling the airflow diverting assembly to divert at least the portion of the boundary layer on the surface of the hub away from the surface of the hub further comprises: actively controlling the variable geometry of the at least one fluid passageway via at least one of one or more fans, one or more actuators, or one or more valves based on a desired flow rate at different circumferential locations of the at least one fluid passageway.

The method of any preceding clause, further comprising de-icing the at least one fluid passageway.

The method of any preceding clause, further comprising directing the portion of the boundary layer diverted away from the surface of the hub to one or more electronic or mechanical components of the engine for cooling.

The method of any preceding clause, wherein directing the portion of the boundary layer diverted away from the surface of the hub to one or more electronic or mechanical components of the engine for cooling further comprises: recirculating the portion of the boundary layer diverted away from the surface of the hub within at least a portion of a hub compartment, a mid-fan compartment, or a core compartment before being exhausted via one or more ventilation paths that act as flow sinks enabling a passive system.

The method of any preceding clause, further comprising arranging one or more flow guides with at least one of the hub compartment, the mid-fan compartment, or the core compartment to direct flow to or away from the one or more electronic or mechanical components of the engine.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing a boundary layer of an open fan of a fan section of an engine, the method comprising:
   forming an airflow diverting assembly downstream of the open fan and upstream of an engine inlet of a turbomachine of the engine, the airflow diverting assembly comprising at least one fluid passageway formed into at least a portion of a hub of the open fan; and
   diverting, via the at least one fluid passageway, at least a portion of a boundary layer on a surface of the hub away from the surface of the hub to reduce distortion caused by the boundary layer in the turbomachine.

2. The method of claim 1, wherein diverting, via the at least one fluid passageway, at least the portion of the boundary layer on the surface of the hub away from the surface of the hub further comprises:
   passively controlling the airflow diverting assembly to divert at least the portion of the boundary layer on the surface of the hub away from the surface of the hub.

3. The method of claim 1, wherein diverting, via the at least one fluid passageway, at least the portion of the boundary layer on the surface of the hub away from the surface of the hub further comprises:
   actively controlling the airflow diverting assembly to divert at least the portion of the boundary layer on the surface of the hub away from the surface of the hub.

4. The method of claim 3, wherein the at least one fluid passageway comprises a variable geometry, wherein actively controlling the airflow diverting assembly to divert at least the portion of the boundary layer on the surface of the hub away from the surface of the hub further comprises:
   actively controlling the variable geometry of the at least one fluid passageway via at least one of one or more fans, one or more actuators, or one or more valves based on a desired flow rate at different circumferential locations of the at least one fluid passageway.

5. The method of claim 1, further comprising de-icing the at least one fluid passageway.

6. The method of claim 1, further comprising directing the portion of the boundary layer diverted away from the surface of the hub to one or more electronic or mechanical components of the engine for cooling.

7. The method of claim 6, wherein directing the portion of the boundary layer diverted away from the surface of the hub to one or more electronic or mechanical components of the engine for cooling further comprises:
   recirculating the portion of the boundary layer diverted away from the surface of the hub within at least a portion of a hub compartment, a mid-fan compartment, or a core compartment before being exhausted via one or more ventilation paths that act as flow sinks enabling a passive system.

8. The method of claim 7, further comprising arranging one or more flow guides with at least one of the hub compartment, the mid-fan compartment, or the core compartment to direct flow to or away from the one or more electronic or mechanical components of the engine.

* * * * *